UNITED STATES PATENT OFFICE 2,118,680

WELDING FLUX AND WELDING ROD

Arthur R. Lytle, Niagara Falls, N. Y., assignor to Oxweld Acetylene Company, a corporation of West Virginia No Drawing. Application July 16, 1936, Serial No. 90,887

10 Claims. (Cl. 219—8)

The invention relates to welding and more particularly to welding fluxes, and to welding rods coated or cored therewith, adapted for use in welding lead-containing nonferrous alloys.

In the oxyacetylene welding of lead-containing nonferrous alloys, for instance lead bronzes and the alloys described in my Patents 2,040,053, 2,040,054, and 2,040,055, issued May 5, 1936, it has been found necessary, in order to prevent boiling and resultant porosity in the weld metal, to employ an oxidizing flame in which the ratio of oxygen to acetylene is on the order of 2, instead of 1 as ordinarily employed in welding. When such a welding flame is used, there is a strong tendency for the weld metal to oxidize and to form a viscous slag of high melting point which accumulates on the surface and within the body of the weld to such an extent as to interfere seriously with the welding process. It is a primary purpose of the present invention to provide means for overcoming the difficulties caused by such oxidation.

I have found that the slag formed as described above can be dissolved and rendered harmless in the welding operation by the use of a flux which comprises, as essential ingredients, the oxides of boron and zinc and a substantial amount of an alkali metal halide. The flux of the invention comprises a mixture of the approximate composition:

| Substance | Broad range | Preferred composition |
|---|---|---|
| | Percent | Percent |
| Borax | 50 to 75 | 60 |
| Zinc oxide | 5 to 40 | 15 |
| Potassium chloride | 10 to 40 | 25 |

The flux of the invention is preferably prepared by fusing borax or boric acid, grinding the fused material, and then mixing it with powdered zinc oxide and alkali chloride in desired proportions to form the flux. Of course, the three essential ingredients of the flux may be mixed in powdered form without prefusion of the borax or boric acid, but the mixture is in such case inferior in its fluxing action to the mixture in which the borax or boric acid is prefused. It will be evident that when borax or boric acid is fused its water of hydration is lost, and the flux prepared from the mixtures hereinbefore described will therefore differ in proportions from the ratios of the original ingredients. Thus, for example, the preferred composition hereinbefore disclosed will, after fusion of the borax, have the approximate composition:

| Substance | Composition |
|---|---|
| | Percent |
| Sodium tetraborate | 45 |
| Zinc oxide | 20 |
| Potassium chloride | 35 |

In the flux of the invention boron oxide may be suitably incorporated either as fused borax or as fused boric acid, and it is to be understood that any suitable oxidic compound of boron may be substituted in whole or in part for fused borax without departing from the spirit and teachings of the invention. Similarly alkali metal halides such as sodium chloride or potassium fluoride may be substituted in whole or in part for potassium chloride, so long as the resultant mixture has a suitable range of melting and boiling point, the required degree of fluidity at welding temperatures, and the capacity for dissolving the metallic oxides formed in the welding operation.

The flux of the invention is suitably employed as a coating or core for welding rods of lead-containing nonferrous metal, for which purpose the flux may be made into a water paste and either painted onto the welding rod or extruded to form a thin coating thereon. Accordingly, the invention also comprises composite welding rods coated or cored with the flux of the invention.

I claim:

1. A welding flux which comprises, as essential ingredients, boron oxide, zinc oxide, and alkali metal halide; the oxides of boron and zinc together amounting to a major part, and the halide amounting to a minor part, of said flux.

2. A welding flux comprising 10% to 40% alkali metal halide, 5% to 40% zinc oxide, remainder oxidic compound of boron.

3. A welding flux comprising 10% to 40% potassium chloride, 5% to 40% zinc oxide, remainder oxidic compound of boron.

4. A welding flux consisting of about 45% sodium tetraborate, about 20% zinc oxide, and about 35% potassium chloride.

5. A welding flux comprising a fused mixture of alkali metal halide, zinc oxide, and oxidic compound of boron; the oxides of boron and zinc together amounting to a major part, and the halide amounting to a minor part, of said flux.

6. A welding flux comprising from 10% to 40% alkali metal halide, from 5% to 40% zinc oxide, remainder fused oxidic compound of boron.

7. A welding flux comprising from 10% to 40% alkali metal halide; the balance consisting of a fused mixture of zinc oxide and oxidic compound of boron.

8. A welding rod comprising a lead-containing nonferrous metal rod and a coating or core of fluxing material thereon, said fluxing material containing, as essential ingredients, boron oxide, zinc oxide, and alkali metal halide; the oxides of boron and zinc together amounting to a major part, and the halide amounting to a minor part, of said flux.

9. A welding rod comprising a lead-containing nonferrous metal rod and a coating or core of fluxing material thereon, said fluxing material containing 10% to 40% alkali metal halide, 5% to 40% zinc oxide, remainder oxidic compound of boron.

10. A composite welding rod comprising a lead-bronze core and a coating of fluxing material thereon, said fluxing material containing 10% to 40% potassium chloride, 5% to 40% zinc oxide, remainder sodium tetraborate.

ARTHUR R. LYTLE.